United States Patent
Haynes et al.

(10) Patent No.: US 7,329,428 B2
(45) Date of Patent: Feb. 12, 2008

(54) PROCESS FOR MANUFACTURE OF AERATED CONFECTIONS WITH DRY BLEND OF SUGAR AND GELATIN

(75) Inventors: Lynne C Haynes, Morris Plains, NJ (US); Pankaj N. Patel, Branchburg, NJ (US); Louise Slade, Morris Plains, NJ (US); Harry Levine, Morris Plains, NJ (US)

(73) Assignee: Kraft Foods Holdings, Inc., Northfield, IL (US)

( * ) Notice: Subject to any disclaimer, the term of this patent is extended or adjusted under 35 U.S.C. 154(b) by 415 days.

(21) Appl. No.: 10/695,469

(22) Filed: Oct. 28, 2003

(65) Prior Publication Data

US 2005/0089619 A1  Apr. 28, 2005

(51) Int. Cl.
 *A23J 3/00* (2006.01)
(52) U.S. Cl. ............................... 426/571; 426/564
(58) Field of Classification Search ......... 426/571, 426/572, 576
 See application file for complete search history.

(56) References Cited

U.S. PATENT DOCUMENTS

| 2,851,364 | A | * | 9/1958 | Peebles | 530/354 |
|---|---|---|---|---|---|
| 3,067,036 | A | * | 12/1962 | Pintauro et al. | 426/576 |
| 3,362,830 | A | * | 1/1968 | Addesso | 426/564 |
| 3,734,745 | A | * | 5/1973 | Cassanelli et al. | 426/564 |
| 3,930,052 | A | * | 12/1975 | De Brou et al. | 426/576 |
| 4,338,350 | A | * | 7/1982 | Chen et al. | 426/658 |
| 4,571,346 | A | * | 2/1986 | Lehmann et al. | 426/576 |
| 5,532,017 | A | * | 7/1996 | O'Donnell | 426/571 |
| 6,180,158 | B1 | * | 1/2001 | Zietlow et al. | 426/571 |
| 6,403,140 | B1 | * | 6/2002 | Tiainen et al. | 426/576 |
| 6,432,460 | B1 | * | 8/2002 | Zietlow et al. | 426/74 |

* cited by examiner

*Primary Examiner*—Keith Hendricks
*Assistant Examiner*—Jyoti Chawla
(74) *Attorney, Agent, or Firm*—Thaddius J. Carvis (57) ABSTRACT

The typically employed step of separately hydrating gelatin in warm water for the preparation of aerated, gelatin-containing confections such as marshmallow is replaced by hydrating a dry blend of sucrose and gelatin in cold water prior to heating. The marshmallow products produced by this process are made more efficiently and have good string. The gelatin processed in this manner undergoes less cis isomerization than occurs during conventional processing. The invention improves processing for the production of marshmallow pieces, marshmallow fillers, e.g., for cookies and candies, dehydrated marshmallow bits and spoonable marshmallow toppings.

11 Claims, 5 Drawing Sheets

PROCESS FOR MANUFACTURE OF AERATED CONFECTIONS WITH DRY BLEND OF SUGAR AND GELATIN

BACKGROUND OF THE INVENTION

The invention relates to a process that improves the efficiency of producing aerated, gelatin-containing confections, such as marshmallows, and provides improved marshmallow products prepared by the process. The production of marshmallow products, including marshmallow pieces, marshmallow fillers, dehydrated marshmallow bits and spoonable marshmallow toppings can be improved.

Marshmallow is one of about eight basic types of confection. In the United States, marshmallow may have a soft or grained body, and may vary in moisture content and texture for various product forms. The basic composition for each kind of marshmallow includes water, monosaccharides such as dextrose and fructose, disaccharides such as sucrose and maltose, sugar syrups such as corn syrup and rice syrup, and a gelling colloid such as gelatin. Coloring and flavoring are added as desired. Although albumen and other colloids have been used, aqueous gelatin is typically employed as the colloid.

Typically, marshmallow is prepared by mixing the sugars and syrups with water. The resulting syrup is concentrated, cooled and then mixed with an aqueous dispersion of a colloid, such as gelatin. The mixture is then pumped through a beater, such as an Oakes beater or other aerating device, and further cooled. It can be formed into pieces of desired shape and size. Marshmallow products can be formed by casting into desired shapes in starch molds and by extruding and cutting into desired-sized pieces. The density of marshmallow is typically between about 200 and 500 grams per liter.

Gelatin is the colloid of choice, due to its ability to facilitate aeration and otherwise provide a desirable combination of properties including long string, freedom from graining, and good shelf stability. The same properties that make gelatin useful in marshmallows make it desirable for a variety of other confections, including candies and desserts. In all, it can impart pleasing bite and mouth-melt properties and give a clean flavor release compatible with a number of popular flavors.

Despite its virtues, gelatin presents challenges to its use in confections, in many processing contexts. It is heat-sensitive, hard to disperse and, as a result, slow to hydrate. These properties are often at cross purposes. Heating to enhance dispersion and hydration can cause trans-to-cis isomerization, which is characterized by a reduced enthalpy for the $T_i$ transition (as determined by Modulated Differential Scanning Calorimetry), indicative of a loss in gel strength. All gelatin-containing products require that the gelatin be dissolved during processing, in order for it to be functional. Other dissolved solids, such as sugars, can inhibit the hydration of gelatin, which can result in decreased functional performance. Typically, gelatin must be hydrated separately from other formula components. Accordingly, the art has developed many different techniques for achieving the necessary dissolution, but all have limitations. In some processes, gelatin does not become fully functional, which can lead to a product that is soft and sticky, and to sugar syrup exuding from the product. Among other things, it would be desirable to reduce the amount of water necessary for dissolution and to increase the time a gelatin solution can be held, without any adverse effect on gel strength. It would also be desirable to find a way to decrease undesirable surface graining by sugar particles.

Exemplary of teachings dealing with solubility limitations for gelatin for desserts is U.S. Pat. No. 3,362,830, to Addesso. This disclosure notes that cold-water-solubility is a property desired for gelatin dessert mixes, in order to permit ease of home preparation. As described in this patent, this property is achieved by first heating a mixture of water, sucrose and gelatin (sucrose-to-gelatin weight ratio of at least 7:1) to a temperature sufficient to obtain complete dissolution. The solution is then foamed and dried on a belt, at a temperature preferably below about 130° F. (about 55° C.). The end-product is said to be "cold-water-soluble", meaning that it can be dissolved in water at temperatures of from about 40 to 80° F. (about 5 to 27° C.). However, in the initial processing, boiling water is used to dissolve the gelatin.

In another patent dealing with gelatin desserts, U.S. Pat. No. 3,702,254, Cassanelli et al. describe preparation of a multilayered and multitextured dessert from a composition containing gelatin. The gelatin can be added separately to the mix, or can be incorporated in it by mixing the gelatin and some of the sugar in hot water to form a slurry, and spray-drying the slurry. The latter approach is said to aid the dissolution of the gelatin, when the dessert mix is hydrated.

In U.S. Pat. No. 6,432,460, Zietlow et al. describe a process for preparing nutritionally fortified marshmallow products by utilizing gelatin as a structuring agent. The description points out that, while there are many types of marshmallow on the market, methods of preparation generally fall into two main process groups, namely extruded marshmallow and deposited marshmallow. They point out that, in both types, sugar syrup and a structuring agent, such as gelatin, are the two main ingredients. They note that the sugar syrup is typically heated to reduce its moisture content and is then cooled and combined with a gelatin solution to form a slurry. The slurry is aerated, and colors and flavors are then added. After aeration, the composition is extruded through a die to form a rope. The die imparts the desired shape to the rope. The rope is allowed to rest briefly to set, and then is cut into desired piece sizes. For dried marshmallows, e.g. dehydrated marshmallow bits, the process can additionally include one or more drying steps.

There remains a need for a method that improves the production of aerated confections, such as marshmallows, containing gelatin.

BRIEF DESCRIPTION OF THE DRAWINGS

The invention will be better understood and its advantages will become more apparent from the following description, especially when read in light of the accompanying drawings, wherein:

FIG. 3 is another process flow diagram for a preferred process arrangement of the invention for preparing marshmallow filler for cookies and the like;

SUMMARY OF THE INVENTION

It is an object of the invention to provide a process for simplifying the preparation of aerated confections such as marshmallow.

It is another object of the invention to provide a process for preparing marshmallow confections having a longer string than that obtained by conventional processing.

It is another object of the invention to provide a process for preparing marshmallow confections based on gelatin, wherein gelatin hydrated for a confectionery process exhibits a longer stable hold time than that obtained by conventional processing.

It is another object of the invention to provide a process for preparing marshmallow confections based on gelatin, wherein the gelatin exhibits less trans-to-cis isomerization than gelatin processed in a conventional manner.

These and other objects are accomplished by the invention, which provides improved processing for preparing gelatin-containing confections, such as marshmallow, and improved confection quality.

The invention comprises a process for preparation of aerated confections comprising: heating corn syrup, composed of mono-, di-, and oligosaccharides, to which may be added other mono- and disaccharides in water to fully dissolve all sugar and concentrate the mixture to obtain a concentrated sugar solution, preferably having solids content of at least 75% by weight; cooling the concentrated sugar solution, separately introducing gelatin preblended with sucrose in the form of a dry blend, hydrating the blend of sucrose and gelatin to form a slurry of hydrated gelatin in a sucrose solution, preferably using a water temperature of less than about 40° C. and for a hold time of at least about 10 minutes, heating the slurry sufficiently, e.g., to a temperature of up to about 75° C., to melt the hydrated gelatin and dissolve the sucrose, admixing the aqueous solution of sucrose and gelatin with concentrated sugar solution to prepare a confection composition, and aerating the confection composition.

In preferred aspects, the dry gelatin and dry sucrose will have approximately similar particle sizes of less than 8 mesh, e.g., about 40 mesh. Also preferred is the concentration of solids in the concentrated sugar solution to be at least 80% by weight. The sucrose and gelatin are preferably present in the dry blend of sucrose and gelatin at a weight ratio of from about 4:1 to about 20:1.

The products of this processing are improved and can take a variety of forms, such as marshmallow pieces, marshmallow fillers, dehydrated marshmallow bits and spoonable marshmallow toppings.

The process and the resulting products have a number of preferred aspects, many of which are described below and shown in the accompanying drawings.

DETAILED DESCRIPTION OF THE INVENTION

The invention relates to improved processing for the production of aerated, gelatin-containing confection products, including marshmallow in the form of pieces, marshmallow fillers or cremes, e.g., for cookies and candies, dehydrated marshmallow bits and spoonable marshmallow toppings. While the invention can be utilized for other related confections, the following description is directed to the production of marshmallow pieces and marshmallow fillers for cookies and the like. The following description will include a number of formulae and ingredient proportions. Unless otherwise specifically mentioned, all parts and percentages will be by weight.

Marshmallow pieces are generally of a geometric shape such as most people are familiar with for eating and roasting. The shape can be any that can be molded or formed by extrusion. The pieces can be "regular-sized" or "miniature". The shape does not have to be cylindrical, and no particular size range is essential, but these products typically have minor dimensions of greater than ¼ inch and major dimensions of less than two inches, or so. The term "marshmallow pieces" includes the smaller varieties particularly adapted for salads, deserts and baking. "Marshmallow pieces" typically have moisture contents within a range of from about 12 to about 20 percent by weight, preferably from about 14 to about 18 percent by weight. Marshmallow pieces are also typically characterized by bulk densities of from about 21 to about 31 ounces per gallon, and preferably from about 22 to about 29 ounces per gallon for larger pieces, and from about 23 to about 30 ounces per gallon for smaller pieces.

The term "dehydrated marshmallow bits" is meant to include essentially dried marshmallow pieces, useful particularly for ready-to-eat cereal products and the like. "Dehydrated marshmallow bits" typically have moisture contents within a range of from about 0.5% to about 5.0% percent by weight, preferably from about 2.0% to about 3.0% percent by weight. "Dehydrated marshmallow bits" are also typically characterized by bulk densities of from about 19 to about 24 ounces per gallon, depending on the shape and size of the dehydrated marshmallow bit pieces.

The term "marshmallow filler" is meant to include soft marshmallow of indeterminate shape, useful particularly for fillers, cremes or toppings for baked goods, including cookies, cakes, pastries, and the like. They can contain egg white as a structure-forming ingredient. "Marshmallow fillers" typically have moisture contents within a range of from about 20 to about 40 percent by weight, preferably from about 25 to about 35 percent by weight. "Marshmallow fillers" are also typically characterized by densities of from about 40 ounces per gallon to about 57 ounces per gallon, and preferably from about 49 ounces per gallon to about 52 ounces per gallon.

The term "spoonable marshmallow" is meant to include soft marshmallow of indeterminate shape, which can be easily spooned from a container at room temperature and preferably at refrigerator temperature as well. It is useful particularly for toppings for desserts of all types and treat-type sandwiches, and the like. "Spoonable marshmallow" typically has a moisture content within a range of from about 50 to about 80 percent by weight, preferably from about 60 to about 75 percent by weight, and exhibits a density of from about 25 to about 65 ounces per gallon, and preferably from about 30 to about 60 ounces per gallon.

Figure 1:
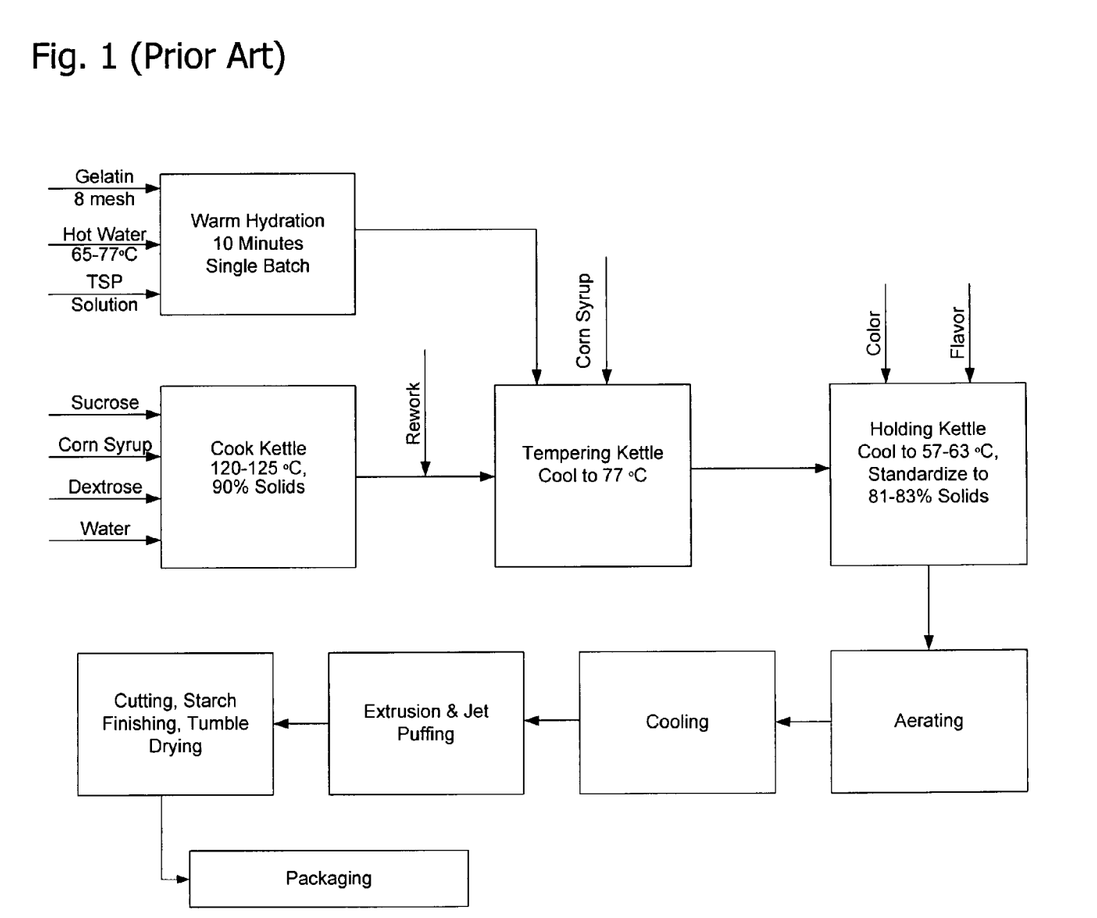
FIG. 1 is a process flow diagram for a process arrangement from the prior art.

The production of all of these products and others is improved by the invention. Reference is made to FIG. 1, which shows a typical prior-art process for preparing marshmallow products. It can be seen that it calls for dissolving gelatin in water at a temperature of from about 65 to 80° C., e.g., from about 65° to 77° C. being typical. Comparison of gelatin processed in this manner to gelatin processed according to the invention has shown that the prior-art procedure caused isomerization of the gelatin to its cis form, to an extent that diminished the desirable properties of the gelatin, such as extensibility and elastic recovery. In addition, the marshmallows prepared according to the prior-art process tended to exhibit surface graining to a greater extent than for those prepared according to the present invention. The extent of isomerization to the cis form can be observed analytically by modulated differential scanning calorimetry (MDSC), by measuring the enthalpy of the peak corresponding to the point defined as $T_i$, the temperature of isomerization for gelatin in marshmallow products. In MDSC, the material being analyzed is heated at a steady rate, with a programmed saw-tooth pattern of heating and cooling superimposed upon the steady rate. The fluctuation in temperature of the saw-tooth pattern is about plus or minus 0.5° C. The MDSC technique allows a more precise analysis of the isomerization temperature, because it separates overlapping thermal events such as irreversible decomposition. The MDSC instrument and method used to characterize the gelatin in marshmallow are described below in Example 7.

The invention is applicable to gelatin of any type suitable for use in confection, e.g., marshmallow, processing. The most typical gelatin materials useful for these types of products are porcine Type-B gelatins having bloom strengths of at least 150, e.g., from about 200 to about 275. The gelatin is preferably granulated to an average particle size that permits hydration in the presence of sucrose. Effective particle sizes will be less than 8 mesh, typically less than 10 mesh, preferably less than 20 mesh, e.g., 30 to 50 mesh, say about 40 mesh. The processing will typically include the addition of from about 0.05 to about 0.25% (based on the final formula weight) of a suitable polyphosphate such as trisodium polyphosphate (STPP), tetrasodium pyrophosphate (TSPP) or metaphosphate such as sodium hexametaphosphate, or the like. The polyphosphate or equivalent can aid in improving the rate of set of gelatin, and should be added at a stage in processing suitable to achieve good solution. For example, it can be added to a portion of the initial processing water, to obtain complete dissolution.

Figure 2:
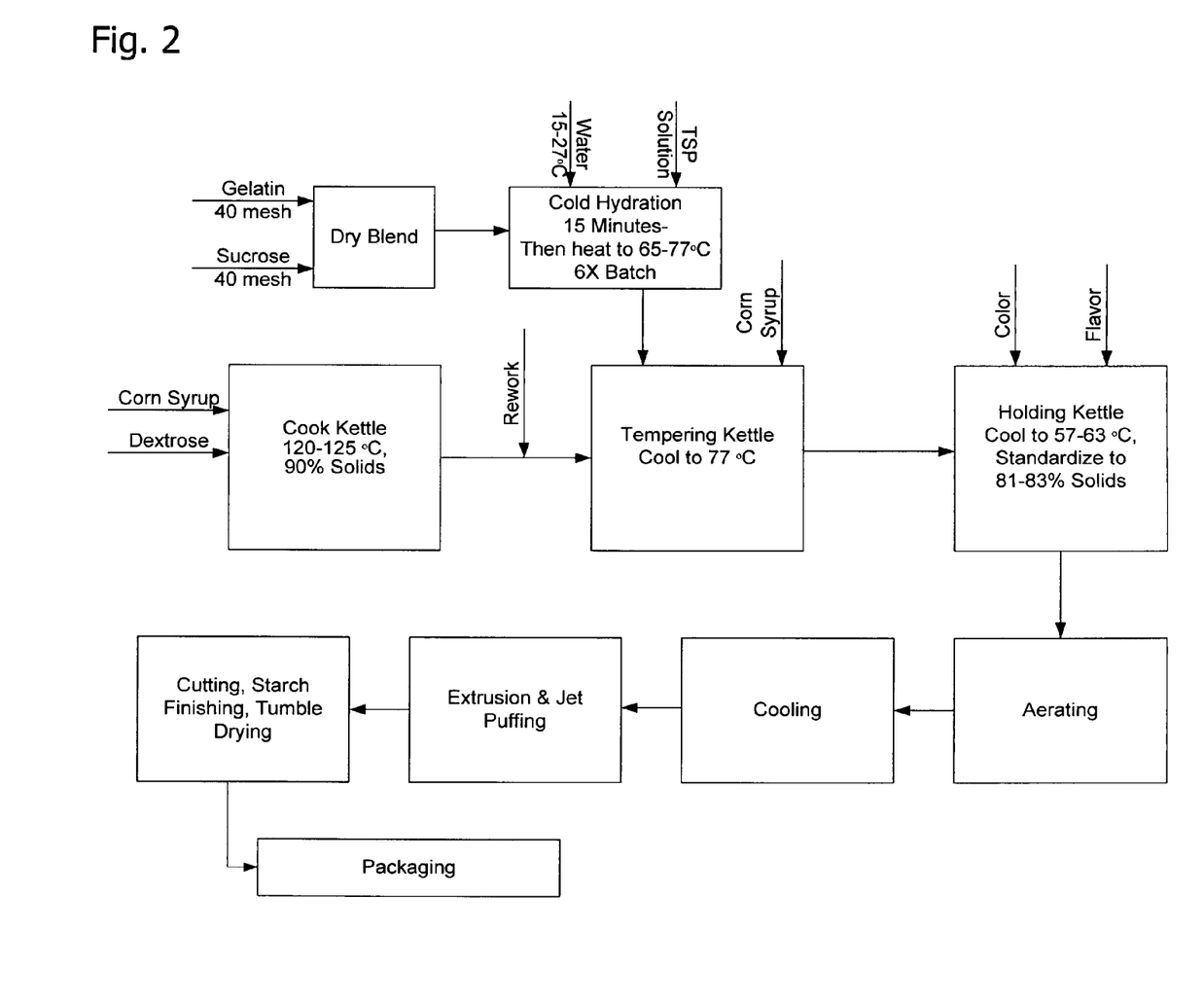
FIG. 2 is a process flow diagram for a preferred process arrangement of the invention for preparing marshmallows.

The method of the invention is illustrated first in FIG. 2 in schematic format. The method improves the preparation of aerated confections, and importantly entails replacing the typically employed step of separately hydrating gelatin in heated water by a procedure using a dry blend of sucrose and gelatin and hydrating the dry blend, with care being taken to utilize particle sizes, hydration times and water temperatures effective to enable essentially full hydration of the gelatin prior to complete dissolution of the sucrose. In preferred aspects, the dry gelatin and dry sucrose will have similar particle sizes of less than 8 mesh, typically less than 10 mesh, and preferably be of essentially the same size of less than about 20 mesh, e.g., 30 to 50 mesh, say about 40 mesh. Prior to the heating of the gelatin-hydrating water, the gelatin and sucrose preblend is permitted to soak in the water, to effectively assure essentially complete hydration of the gelatin, before the sucrose becomes so fully dissolved that it seriously inhibits gelatin hydration. Following hydration of the gelatin, the water, sucrose and gelatin are heated to form a homogeneous solution. The sucrose and gelatin are preferably present in the dry blend of sucrose and gelatin at a weight ratio of from about 4:1 to about 20:1.

By utilizing the process of the invention, one can achieve the aforementioned advantages, importantly including the product improvements and the ability to hold the gelatin solution for longer periods of time. The use of the combined ingredient makes batching easier and eliminates at least one potential source of error on the plant floor. In addition, the capability to hold the gelatin solution for longer periods of time permits larger batches to be prepared, preferably sufficient for a plurality, e.g., from 4 to 10, batches, of confection composition.

The diagram in FIG. 2 shows one preferred process arrangement according to the invention. In a first step, a dry blend of sucrose and gelatin is used, with the particle sizes of the two components being essentially the same, as described above. The sucrose and gelatin are preferably present in the dry blend at a weight ratio of from about 4:1 to about 20:1. The ratio of water to dry ingredients can be within a range of about 3:7 to 2:1. Preferably, 2.5 parts dry ingredients and one part water are effective, but this can be varied. The slurry is permitted to sit for a period of time at a temperature effective to hydrate the gelatin. Preferably, the gelatin is permitted to hydrate sufficiently to take up at least twice its weight in water, e.g., from about 3 to 5 times its weight.

The particle sizes, hydration times and water temperatures are determined to be those effective to enable essentially full hydration of the gelatin prior to complete dissolution of the sucrose. The gelatin and sucrose preblend is soaked in water under conditions effective to assure essentially complete hydration of the gelatin, before the sucrose becomes so fully dissolved that it seriously inhibits gelatin hydration. Initial water temperatures should be essentially cool, not exceeding about 40° C., with water at about 20 to 35° C. being effective. Higher temperatures promote rapid dissolution of sucrose, before the gelatin becomes essentially fully hydrated, and are not effective for that reason. Hydration times at this first, lower temperature, vary from about at least 10 minutes up to about 15 to 30 minutes. While not preferred, a portion of the gelatin can be added to the water prior to adding all of the sucrose, to facilitate prehydration of the gelatin. Longer hydration time periods do not provide any significant improvement in hydration.

Following hydration of the mixture containing gelatin, this mixture of water, sucrose and gelatin is heated to a temperature effective to form a solution, without causing rapid loss of gelatin gel strength. The slurry is preferably heated to a temperature of at least about 60° C., e.g., from about 65 to about 75° C., and maintained at that temperature while awaiting use in processing. It is an advantage of the invention that the solution of sucrose and gelatin, prepared according to the invention, exhibits good stability on holding, preferably maintaining suitable properties for at least one hour and up to about 4 hours at 65° C. This long hold time permits a larger batch of gelatin solution to be prepared than might be needed for an individual confection batch, thus permitting larger batches, preferably sufficient for a plurality of, e.g., from 4 to 10, batches of confection composition to be prepared at one time. In this manner, quality assurance and batching are simplified.

Separately from the preparation of the gelatin solution, a cook kettle is prepared for heating a mixture of sucrose and other sugars, including mono- and disaccharides, to fully dissolve them. Preferably, sucrose is mixed with water and other sugars, including suitable monosaccharides such as fructose and dextrose, alone or as mixtures making up invert sugar, corn syrup, e.g., containing mono, di and oligosaccharides, high fructose corn syrup, and the like. Other sources, such as honey, and plant-derived syrups can also be employed, where their characteristic flavors are acceptable. The mixture of sugars is then heated suitably to concentrate it to at least about 75% solids by weight, preferably from about 80 to 85%. Final cook temperatures are typically within a range of from about 120 to about 125° C. The relative amounts of mono- and disaccharides would be effective to achieve the necessary crystal control in the product, and will typically be at a weight ratio of from about 2:1 to about 1:2 of monosaccharides to sucrose, with near-equal weight ratios being effective.

The concentrated sugar solution is then cooled to a suitably low temperature for mixing with a prepared gelatin mixture (described below), by adding room temperature sucrose or other sugars or syrups, prepared as above or purchased or prepared separately, or other suitable direct or indirect cooling medium or means. The concentrated sugar solution is desirably cooled to about the same temperature as that of the gelatin and sugar solution, e.g., on the order of less than about 85° C., e.g., from about 65 to about 75° C. Depending on the moisture content desired for the product, the cooling can be aided by the use of some of the sugar syrup, e.g., monosaccharide/disaccharide/oligosaccharide syrup, or blend thereof or water. Not shown is the optional addition of water to adjust the moisture content, as might be suitable for some process schemes for marshmallow fillers and spoonable toppings, which generally are made with higher moisture contents than that of marshmallow pieces. It is an advantage of a preferred aspect of the invention that less added water can be employed and yet proper concentrations can be maintained.

Following cooling of the concentrated sugar solution, the aqueous solution of sucrose and gelatin is then mixed with it to prepare a confection composition, which can also contain flavors and colors as desired.

The confection composition prepared in this manner is then subjected to conventional aerating and shaping. Aeration can be accomplished by means such as an Oakes mixer or the like, and shaping can be done individually by molding, e.g., in starch molds, or continuously, such as by extrusion. Marshmallow fillings and spoonable marshmallow toppings are not preshaped, but are aerated. Bulk densities as suitable for the intended products and as described earlier can be achieved. The resulting in-process product shows good string, resilience, superior processing and demonstrates a decrease in extruder head wash frequency, and the dehydrated marshmallow product exhibits a less grainy surface, good integrity when wetted with milk and good shelf-life.

The following examples are presented to further illustrate and explain the invention. They are intended to be exemplary rather than limiting. As above, all parts and percentages are by weight unless otherwise specifically indicated.

EXAMPLE 1

Figure 3:
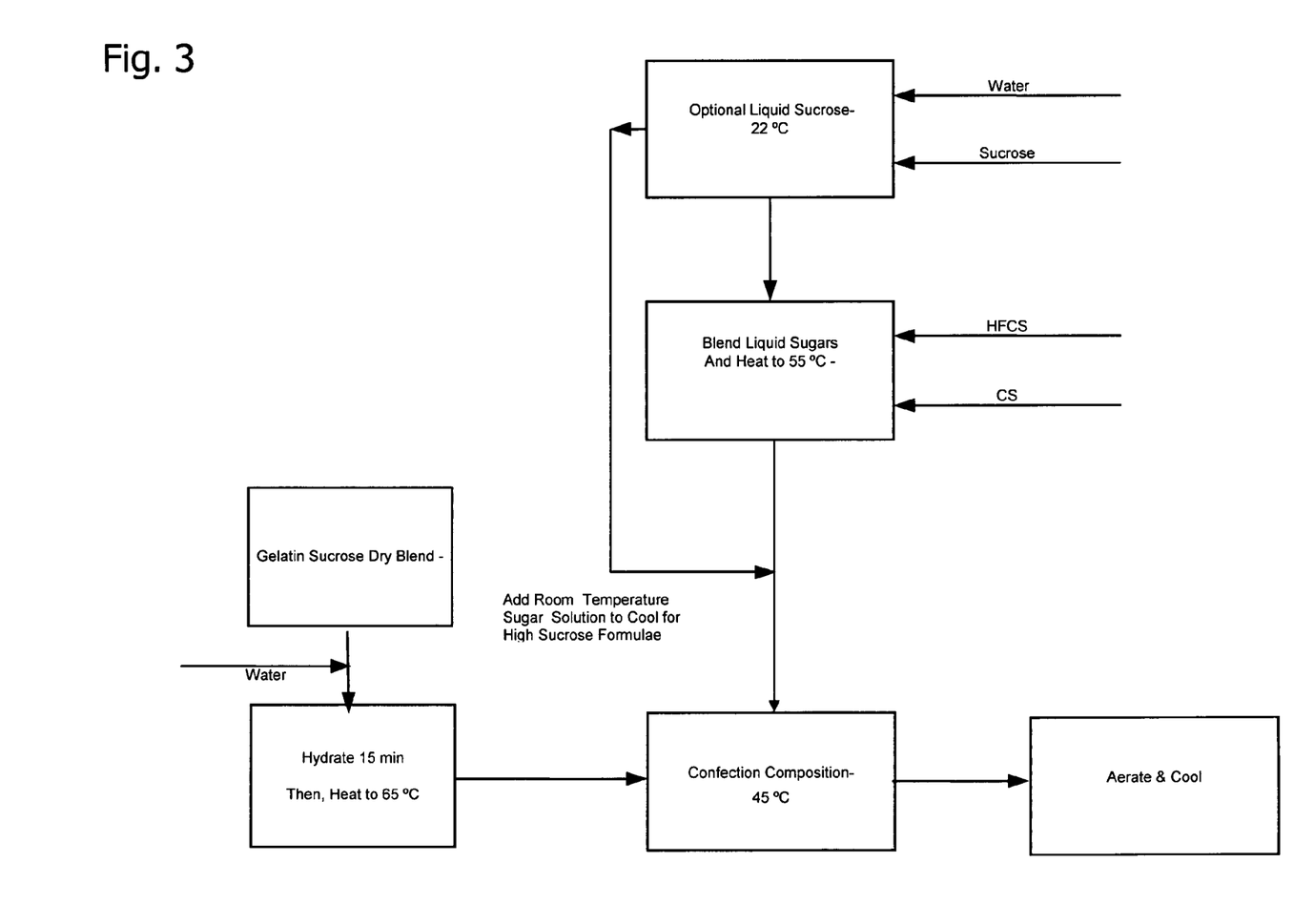

This example describes the preparation of marshmallow cookie filler by an exemplary prior art process as will be improved by the process of the invention as illustrated in FIG. 3. Sugar, water, gelatin, high fructose corn syrup and 62 DE corn syrup are processed as follows:

A 200 g batch of liquid sucrose is prepared by weighing 134 g sucrose and mixing with 66 g of water. The mixture is heated to 65° C. to achieve full dissolution of the sugar, and the resulting sugar solution is then cooled to about 22° C.

Separately, a slurry of 6.9 g gelatin in 37 g of water is prepared and heated to 55° C.

A blend is made of 79 g of the above liquid sucrose, 76 g of HFCS, and 100 g of 62 DE corn syrup, and this blend is heated to about 55° C. to.

All of the gelatin slurry made above is added to the sugar solution blend.

The resulting mixture of gelatin and sugar solution is then cooled to about 45° C. by the addition of 121 grams of the cooled liquid sucrose prepared above, to obtain a liquid confection blend.

This liquid confection blend is then aerated by mixing for 5 minutes using an Oakes mixer at speed setting 3.

EXAMPLE 2

The same ingredients, in the same proportions are utilized in this example, as in Example 1, to provide a product according to the invention in the manner shown in FIG. 3. This example employs an 80:20 sugar:gelatin blend in the gelatin hydration step.

A 200 g batch of liquid sucrose is prepared by weighing 134 g sucrose and mixing with 66 g of water. The mixture is heated to 65° C. to achieve full dissolution of the sugar, and the resulting sugar solution is then cooled to about 22° C.

Separately, a gelatin and sugar solution is prepared by adding 16.75 g of room temperature water (about 25° C.) to a dry blend of 27.6 g sugar and 6.9 g gelatin, and hydrating for 15 min before heating to 55° C. The gelatin and sucrose are both about 40 mesh.

A sugar blend is made from 79 g of liquid sucrose, 76 g of HFCS, and 100 g of 62 DE corn syrup. This sugar blend is then heated to 55° C.

The sugar-gelatin solution is then added to the sugar blend, and this mixture is cooled to 45° C. by adding 61 g of room temperature liquid sucrose prepared above to obtain a liquid confection blend.

This liquid confection blend is then aerated by mixing as in Example 1.

EXAMPLE 3

The same ingredients, in the same proportions, are utilized in this example, as in Example 1, to provide a product according to the invention. This example employs a 95:5 sugar:gelatin blend in the gelatin hydration step.

A gelatin and sugar solution is prepared by adding 66 g of room temperature water (about 25° C.) to a dry blend of 134 g sucrose and 6.9 g gelatin, and hydrating for 15 min before heating to 55° C. The gelatin and sucrose are both about 40 mesh.

A sugar blend is made by combining 76 g of high fructose corn syrup and 100 g of 62 DE corn syrup. This sugar blend is then heated to 55° C.

The sugar and gelatin solution is then added to the sugar blend, and this mixture is cooled to 45° C., to obtain a liquid confection blend.

This liquid confection blend is then aerated by mixing as in Example 1.

EXAMPLE 4

In a prior art process similar to that shown in FIG. 1, the following ingredients and procedures were employed to produce a control batch of marshmallow pieces of regular size.

In a kettle, 18.0 g of corn syrup, 8.0 g of dextrose, 21.0 g of sucrose (40 mesh) and 1.6 g of water were mixed and heated to about 121° C., to a solids content of about 82.1%. The resulting cooked sugar mixture was then cooled to about 77° C. by the addition of 45 g of corn syrup.

Then, hot water (77° C.) was added to a separate gelatin kettle and 0.1 g of TSPP was added and dissolved. To this gelatin of 8 mesh particle size and 250 Bloom was added and allowed to hydrate for about 15 minutes with the temperature being about 74° C.

This gelatin solution was then added to the cooked and cooled sugar mixture prepared above. Color and flavor were added, and the final mix was subsequently conventionally processed to produce marshmallow control samples.

EXAMPLE 5

The same ingredients, in the same proportions are utilized in this example as in Example 4 to provide a product according to the invention as illustrated schematically in FIG. 2. This example employs an 80:20 sugar:gelatin blend in the gelatin hydration step.

Corn syrup, dextrose, sugar and water were mixed and heated to 121° C.

This mixture was cooked to 84.6% solids.

This mixture was cooled to 77° C. by addition of corn syrup.

A dry sugar:gelatin:TSPP blend was hydrated in ambient temperature (30° C.) water for 15 minutes, and then this liquid slurry was heated to 74° C. and held at that temperature, prior to addition to the other batch of cooked ingredients. This sugar:gelatin dry blend was made up manually, using sugar as above and 40-mesh particle size and the same Blom strength gelatin as in Example 4. Dry TSPP (0.1 gram) was added to the dry sugar:gelatin blend, to test the feasibility of minimizing processing steps.

The hot liquid slurry of sugar:gelatin:TSPP was added to the cooked-cooled mixture of corn syrup, dextrose, water and sugar. Color and flavor were then added, and the final mix was than conventionally processed to produce marshmallow samples. It was observed that the gelatin exhibited a longer string than that observed for control. The marshmallow pieces were then packaged for testing, which produced the following result.

The textural properties of the marshmallow made from the sugar-gelatin blend were determined by measuring the compression force (required to penetrate the marshmallow). In this method, a TA-XT2 texturometer (Stable Micro Systems Ltd.) is equipped with a 6 mm-cylindical probe and uses a 25 kg load cell. Test settings are as follows:

Mode: Compression force
Option: Return to start
Pre-test speed: 1.0 mm/s
Test speed: 2.0 mm/s
Post-test speed; 10.0 mm/s
Distance: 10 mm
Trigger type: Auto-20 g
Data Acquisition rate: 400 pps Once the probe triggers on the surface of the marshmallow it then proceeds to penetrate to a depth of 10 mm within the sample. At this point the force value is recorded and taken as a measure of "hardness" of the marshmallow.

Marshmallow color was measured using a Hunter Miniscan calorimeter set-up as follows:

| | |
|---|---|
| Sensor | Universal 45/0 LAV (3078) |
| Illuminant | 10°/D65 |
| Display | Lab |
| Filter | None |

As shown in the following table, test results showed that the marshmallow made from sugar-elatin blend, in accordance with the invention, had greater uniformity in firmness and color.

| Sample | Firmness Force | Color L* | a* | b* |
|---|---|---|---|---|
| Control-begin | 93 g to 185 g | 88.54 | −1.31 | 5.09 |
| Control-end | 170 g to 176 g | 71.36 | −1.34 | 4.7 |
| Test-begin | 129 g to 179 g | 72.64 | −0.94 | 6.69 |
| Test-end | 112 g to 172 g | 82.03 | −0.83 | 6.71 |

EXAMPLE 6

The same ingredients, in the same proportions are utilized in this example as in Example 4 to provide a product according to the invention. This example employs an 90:10 sugar:gelatin blend in the gelatin hydration step.

Corn syrup and dextrose were mixed and heated to 121° C., to produce a cooked sugar syrup of 83.3% solids.

This cooked sugar syrup was then cooled to 77° C. by addition of remaining corn syrup.

A dry sugar:gelatin:TSPP blend was hydrated in ambient temperature (30° C.) water for 15 minutes, and then this liquid slurry was heated to 74° C. and held at that temperature, prior to addition to the other batch of cooked ingredients.

The hot liquid slurry of sugar:gelatin:TSPP was added to the cooked-cooled mixture of corn syrup, dextrose, and water. Color and flavor were then added, and the final mix was then conventionally processed to produce marshmallow samples. It was again observed that the gelatin exhibited a long string. The marshmallow pieces were then packaged for testing, which produced the following results:

Consumer testing showed a preference for marshmallows made from a sugar-gelatin dry blend.

Figure 4A:
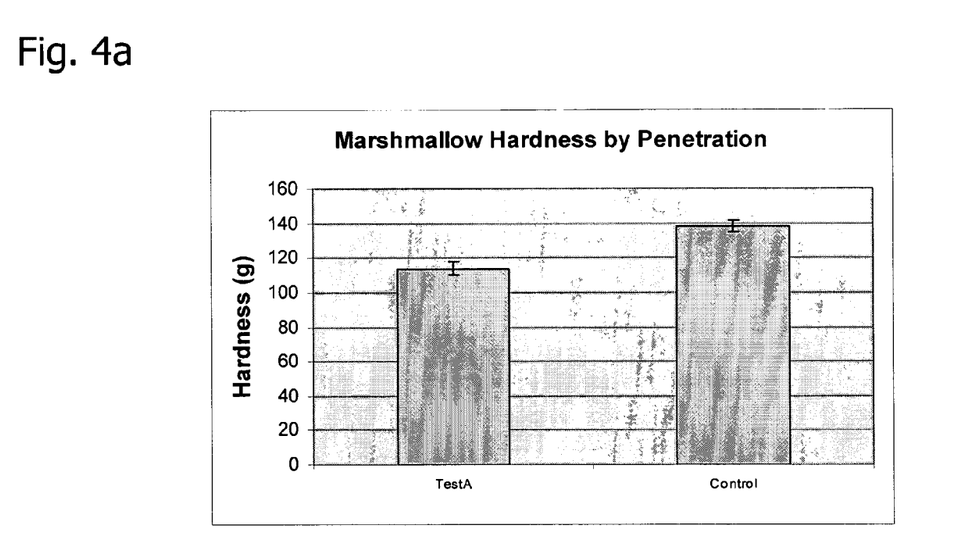
FIGS. 4a and 4b show textural characteristics of control marshmallow produced in Example 4, and marshmallow produced in Example 6, in accordance with the present invention.
Figure 4B:
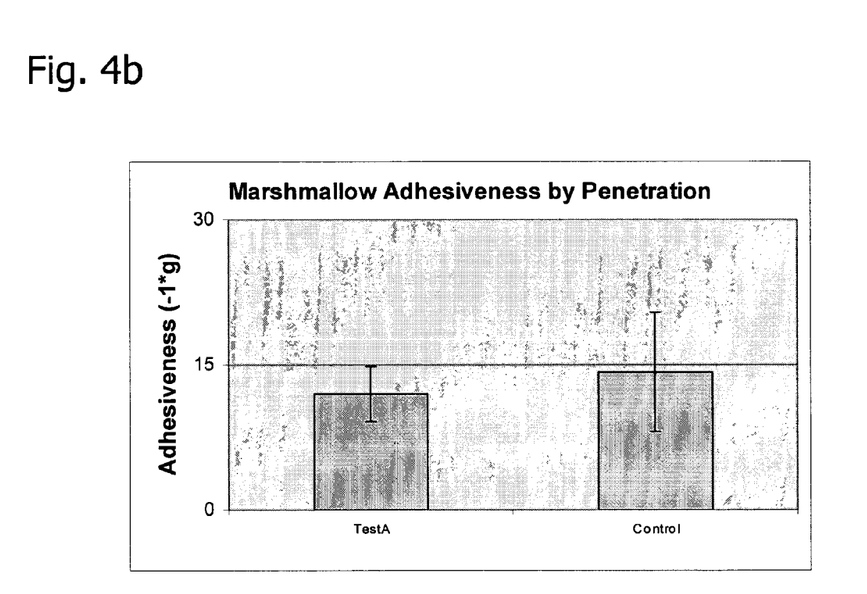

The textural characteristics of the marshmallow were determined. The texture measurement method was the same as described in Example 5 with the added recording of the maximum force required withdrawing the probe from the marshmallow, referred to as "stickiness". FIGS. 4a and 4b and the table below show the texture measurement data for firmness (or softness) and adhesiveness (stickiness) of control and test marshmallows made in accordance with the invention.

Textural Characteristics

| Sample | Firmness (Force, g) | St. dev | Adhesiveness (Force, g) | St. dev |
|---|---|---|---|---|
| Test A | 113.75 | 3.86 | 11.99 | 2.82 |
| Control | 138.28 | 5.09 | 14.30 | 2.97 |

EXAMPLE 7

The same ingredients, in the same proportions, except with more sugar added, are utilized in this example, as in Example 4, to provide a product according to the invention. This example employs an 90:10 sugar:gelatin blend in the gelatin hydration step.

Corn syrup, dextrose, sugar and water were mixed and heated to 124° C., to produce a cooked sugar syrup 84.9% solids.

This cooked sugar syrup was then cooled to 77° C. by addition of remaining corn syrup.

A dry sugar:gelatin:hexametaphosphate blend was hydrated in ambient temperature (30° C.) water for 15 minutes, and then this liquid slurry was heated to 74° C. and held at that temperature, prior to addition to the other batch of cooked ingredients.

The hot liquid slurry of sugar:gelatin:hexametaphosphate was added to the cooked-cooled mixture of corn syrup, dextrose, sugar and water. Color and flavor were then added, and the final mix was then conventionally processed to produce marshmallow samples. It was again observed that the gelatin exhibited a long string.

The marshmallow pieces were then packaged for testing, which produced the following results: The thermal properties (including the melting profile) of the gelatin in the marshmallow was determined by modulated differential scanning calorimetry (MDSC). In this technique, the material being analyzed is heated at a steady rate with a programmed saw-tooth pattern of heating and cooling imposed upon the steady rate. The fluctuation in temperature allows a more precise analysis of the peptide isomerization because it separates overlapping thermal events such as cold crystallization and irreversible decomposition.

Instrument: TA Instruments Modulated Differential Scanning Calorimeter, which includes the TA instruments Q1000 Auto MDSC, Q series RCS unit, and the TA5000 Advantage Software Suite Sample Pans: Perkin-Elmer Stainless Steel O-ring pans
Sample preparation: The sample is weighed into a DSC pan, in amounts of 30 mg to 50 mg.

Instrument Calibration: The modulated DSC is calibrated for baseline, cell constant, temperature and heat capacity in known manner MDSC method:
Equilibrate 10 C
Data storage OFF
Isothermal 5 min
Modulate +/−0.5 C every 80 sec
Data Storage on
Ramp 4 C/min to 190 C
Return to set temp 30 C Sample characterization: The reversing heat flow curve is integrated from 109° C. to 150° C. to measure the enthalpy of the trans to cis isomerization of gelatin in marshmallow.

Figure 5:
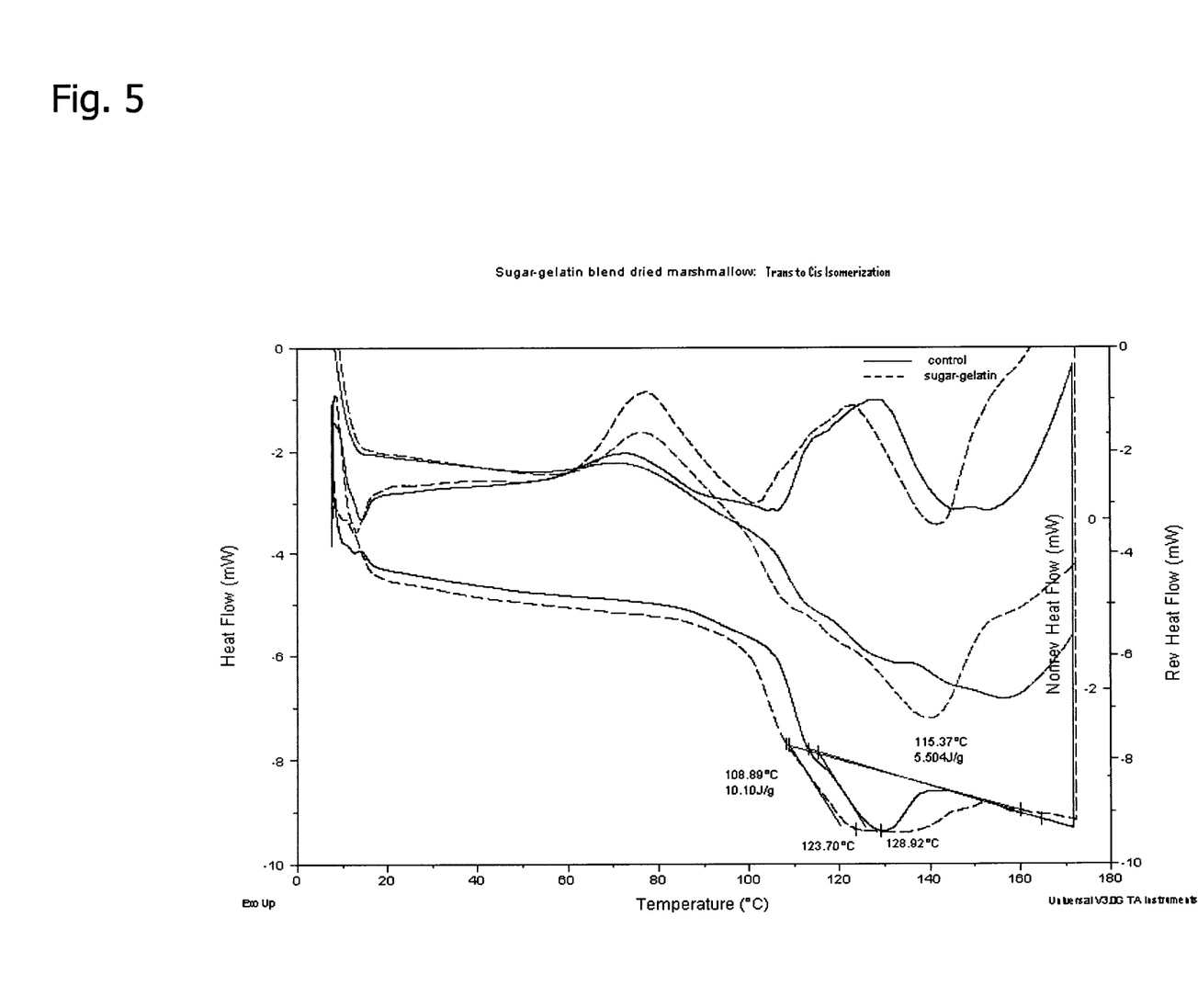
FIG. 5 shows modulated differential scanning calorimetry (MDSC) curves for dried marshmallow obtained in Example 7, in accordance with the present invention.

As shown in FIG. 5, for dried marshmallow made from a sugar-gelatin blend, the onset of trans-to-cis isomerization of the gelatin appears to occur at about 109° C., the endothermic peak is at about 124° C., and the endpoint of the trans-to-cis isomerization is about 150 C. The enthalpy of the isomerization is 10.1 J/g, indicating significantly more of the gelatin in the trans conformation than that found for the control (5.5 J/g).

The above description is intended to enable a person skilled in the art to practice the invention. It is not intended to detail all of the possible modifications and variations, that would become apparent to a skilled worker upon reading the description. It is intended, however, that all such modifications and variations be included within the scope of the invention, which is detailed in the above description and otherwise defined by the following claims. The claims are meant to cover the indicated elements and steps, in any arrangement or sequence that is effective to meet the objectives intended for the invention, unless the context specifically indicates the contrary.

The invention claimed is:

1. A process for preparation of aerated, gelatin-containing confections comprising:
   (a) heating a mixture of mono, di and oligosaccharides in water to fully dissolve all sugar and concentrate the mixture and obtain a concentrated sugar solution;
   (b) cooling the concentrated sugar solution;
   (c) separately mixing dry sucrose and dry gelatin to form a dry blend, wherein the dry gelatin and dry sucrose have similar particle sizes of less than 8 mesh;
   (d) hydrating the dry blend of sucrose and gelatin by mixing with water at a first temperature not exceeding 40° C. and holding at a temperature not exceeding 40° C. for a time sufficient for the gelatin to take up at least twice its weight in water to form a slurry of hydrated gelatin in a sucrose solution;
   (e) then heating the slurry to a higher temperature to dissolve the gelatin and form an aqueous solution of sucrose and gelatin;
   (f) admixing the aqueous solution of sucrose and gelatin with said concentrated sugar solution of step (a) to prepare a confection composition; and
   (g) aerating the confection composition, wherein the processing steps (a) to (f) cause less trans-to-cis isomerization in the gelatin than would otherwise occur in processing wherein gelatin and sucrose are mixed after forming separate solutions of each.

2. A process according to claim 1 wherein the concentrated sugar solution has a solids content of at least 75% by weight.

3. A process according to claim 1 wherein the hold time in step (d) is at least about 10 minutes.

4. A process according to claim 3 wherein the dry gelatin is granulated and has a particle size of less than 20 mesh.

5. A process according to claim 4 wherein the dry gelatin is granulated and has a particle size of about 40 mesh or less.

6. A process according to claim 1 wherein the dry gelatin and dry sucrose are granulated to about the same particle sizes.

7. A process according to claim 6 wherein the dry gelatin is granulated and has a particle size of less than 20 mesh.

8. A process according to claim 1 wherein the mixture comprising mono, di and oligosaccharides was heated in water to fully dissolve all sugar and concentrate the mixture to obtain a concentrated sugar solution having solids content of at least 75% by weight.

9. A process according to claim 8 wherein the mixture is heated to obtain a concentrated sugar solution having solids content of from 80% to 85% by weight.

10. A process according to claim 1 wherein the sucrose and gelatin are present in the dry blend of sucrose and gelatin at a weight ratio of from about 3:1 to about 25:1.

11. A process according to claim 9 wherein the sucrose and gelatin are present in the dry blend of sucrose and gelatin at a weight ratio of from about 4:1 to about 20:1.

* * * * *